Figure 3:
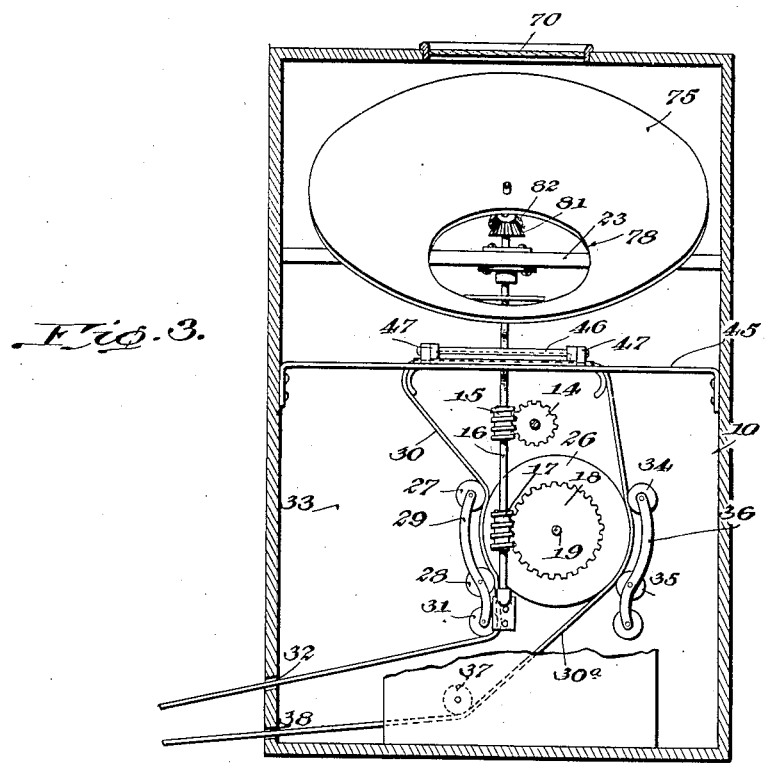

Oct. 6, 1936.   F. B. CROSIER   2,056,600
PROCESS AND APPARATUS FOR PRODUCING STEREOPTICON MOTION PICTURES
Original Filed Dec. 21, 1932   2 Sheets-Sheet 1
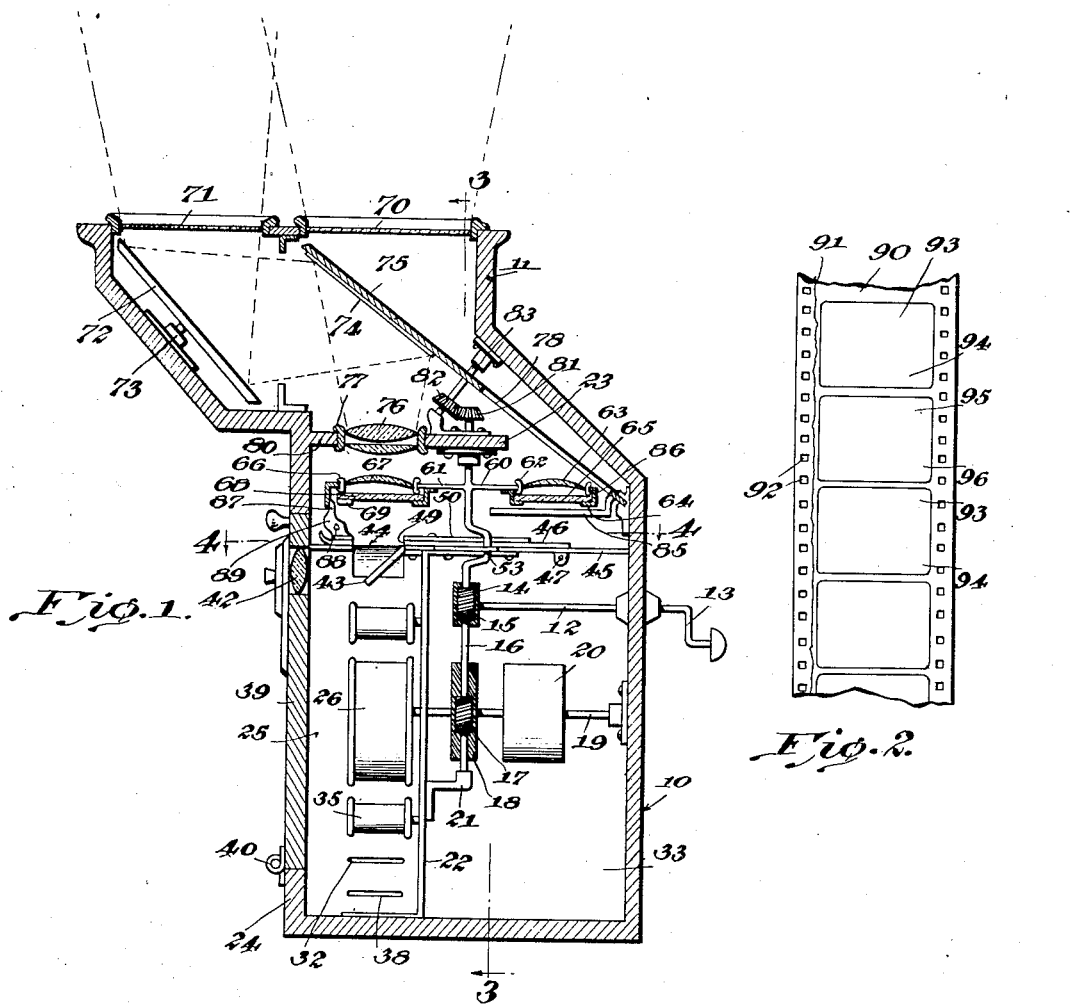
WITNESSES
INVENTOR
F. B. Crosier,
BY
ATTORNEY Oct. 6, 1936.  F. B. CROSIER  2,056,600
PROCESS AND APPARATUS FOR PRODUCING STEREOPTICON MOTION PICTURES
Original Filed Dec. 21, 1932   2 Sheets-Sheet 2

WITNESSES

INVENTOR
F. B. Crosier,
BY
ATTORNEY

Patented Oct. 6, 1936

2,056,600

UNITED STATES PATENT OFFICE 2,056,600

PROCESS AND APPARATUS FOR PRODUCING STEREOPTICON MOTION PICTURES

Frank B. Crosier, Beloit, Wis.

Application December 21, 1932, Serial No. 648,270
Renewed August 10, 1936

6 Claims. (Cl. 88—16.8)

This invention relates to the motion picture art and is more particularly directed to a stereoscopic motion picture camera for producing binocular motion picture effects.

The device involved herein is predicated upon the known properties of the human eye; that is to say, the persistence of vision by which an impression on the retina remains for a short period after one of a series of successive views are shown so that such successive views merge as one on the retina as a continuous uninterrupted optical display and on that property of the human eye known as "optical synthesis" by which the two eyes automatically merge together a right and a succeeding left binocular view which two views are combined in retina placement in point of time by persistence of vision.

This continuity of optical impression or persistence of vision coupled with the faculty of optical synthesis makes possible the further and important feature in my device, of photographing successive right and left binocular views in successive periods of time.

My apparatus may be employed, by the aid of an adapting apparatus with standard motion picture photographic apparatus but it is preferably practised by means of a specially designed photographic device for increasing the time interval between successive photographic members which in the normal motion picture camera is at the rate of sixteen exposures per second, thus giving the eye, when the film is projected, more time to function in synthesis with little or no strain, and within the time range of persistence of vision.

My apparatus for producing binocular motion picture photography includes as an important feature in addition to the alternation of views in successive periods of time, the recordation of these successive right and left views upon successive frames of a continuous film at a common point of focus so that proper registry is secured and the application of the film to the present day standard single lens motion picture cameras is permissible.

Another object of the invention is the provision of a photographic product consisting of a projection reel for motion pictures for obtaining optically delineated main characters and objects in the foreground in natural colors and relief, while the background is indistinct and has only color tints, while sound effects are co-related to them.

A further object of the invention is the provision of an apparatus for obtaining optically delineated main characters and objects in the foreground and natural colors in relief to provide a film in which alternate frames of the film are adapted to reproduce one combination of primary colors while the remaining frames produce a different combination of primary colors, medium focus lens being employed in connection with color screens which are moved alternately into position for delineating scenic effects upon the film with a color screen being removable to photograph objects or scenes in black and white.

Another object of the invention is the provision of an apparatus for recording near and medium foreground objects with stereoscopic effects and in natural color effects while the background is indistinct and having very little color so that the background appears approximately as a neutral gray.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 4:
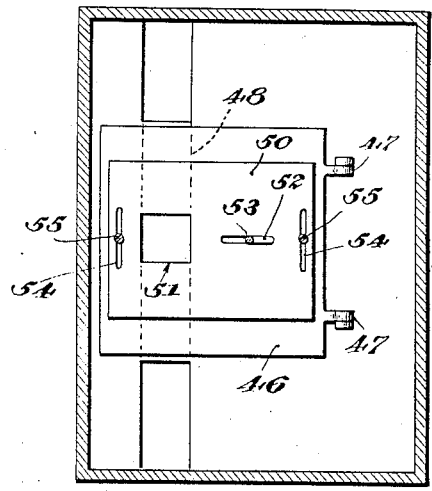

In the drawings:

Figure 1 is a vertical section of an apparatus constructed in accordance with the principles of my invention, Figure 2 is a section of a film reproduced by the apparatus shown in Figure 1, Figure 3 is a section taken along the line 3—3 of Figure 1, and with the shutter shown in perspective, Figure 4 is a horizontal section taken along the line 4—4 of Figure 1.

Referring more particularly to the drawings, 10 designates a housing for enclosing the main body of the mechanism for operating a moving picture device and this housing is provided with an offset portion 11 through which the rays of light from the scene are directed into the camera and in which is located the mechanism for alternately controlling light rays from the left and right hand side of the scene.

A driving shaft 12 is mounted in suitable bearings in the housing 10 and has an operating crank 13 located externally of the housing. On the inner end of the crank is provided a worm wheel 14 meshing with a worm 15 secured to a shaft 16 located vertically within the housing 10. A worm 17 also secured to the shaft 16 drives a worm gear 18 secured to a shaft 19 and this shaft carries a flywheel or weighted member 20.

A bearing 21 at the lower end of the shaft 16 is secured to a partition 22 extending vertically and transversely of the housing 10. A second bearing 23 at the upper end of the shaft 16 is disposed adjacent the offset portion 11 of the housing and will be presently described.

The partition 22 forms with the side wall 24 of the housing 10 a chamber 25 in which is located the mechanism for supporting and moving the film within the camera.

A drum 26 is located within the chamber 25 and is secured to the inner end of the shaft 19 and is revolved thereby. A series of rollers 27 and 28 is carried by an arm 29 which is adapted to maintain the film 30 in contact with the drum 26. A third roller 31 is carried by the arms 29 and is adapted to engage the film just before said film passes through a port 32 in one wall 33 of the housing 10.

At the opposite side of the drum 26 is shown a plurality of rollers 34 and 35 carried by arms 36 which engage the incoming portion of the film 30a for maintaining such portion in engagement with the drum 26. A roller 37 is in contact with this portion of the film as the film enters an opening 38 in the wall 33 of the housing 10.

A door 39 hinged at 40 at the lower end of an opening 24 of the housing 10 provides entrance to the chamber 25 in order to inspect or repair the film when necessary.

The lens 42 is mounted in an opening at the upper end of the door 39 in order to permit the operator to inspect the image reflected by a mirror 43 located at an angle of 45° beneath a film opening 44 so that the operator may be able to determine the proper position of the image when focusing the lens of the camera.

A partition 45 is located in a horizontal plane above the mirror 43 and is supported not only by the side walls of the housing 10 but by the upper end of the partition 22. The partition 45 likewise has an opening so that the light rays may fall upon the mirror 43 in order to reflect the rays through the lens 42.

A plate 46 is hinged at 47 on the partition 45 and is adapted to be raised in order to permit the proper threading of the film. This plate is provided with a groove 48 through which the film runs across the opening 44. This plate is likewise provided with an opening as shown at 49 through which the light rays may pass to the film 30 as it is moved over said plate.

A shutter 50 is slidably mounted upon the hinged plate 46 and is provided with a light opening 51 to permit the light rays to strike the film on the plate 46. The shutter is provided with a slot 52 adapted to receive a crank 53 formed integrally with the shaft 16 so that the shutter may be oscillated back and forth to cut off the light and then expose the film to the light twice during the rotation of the shaft 16 for a purpose which will be presently explained.

The shutter 50 is also provided with slots 54 adjacent its opposite side edges and these slots are located at right angles to the slot 52. Pins 55 projecting from the hinged plate 46 are received within the slots 54 for guiding the plate in its reciprocatory motion.

The shaft 16 above the crank 53 is provided with diametrically disposed arms 60 and 61. A holder 62 is secured to the outer end of the arm 60 and is adapted to carry a medium focus lens 63. Beneath the lens is provided a holder 64 adapted to receive a filter 65 which will permit an orange-red light to pass through the film so that any colors in the photographic image containing blue and green would be filtered out from the light rays. The filter 65 is removable so that the camera may be employed for taking photographs in black and white.

The arm 61 carries a holder 66 in which is mounted a medium focus lens 67. A filter 68 filters out any rays having orange or red therein while permitting rays of the blue-green type to pass to the film. The filter 68 is carried in a bracket or holder 69 from which the filter may be readily removed. It will be noted by this arrangement that as the shaft 16 is revolved through 180° one filter and its corresponding lens will be moved across the opening 44 while the lens 67 and its respective filter 68 will be moved across the opening after the shaft 16 has revolved 180° to provide alternate filtered exposures of the frames of the film 30.

The upper portion of the offset section 11 of the housing 10 is provided with openings closed by transparent members 70 and 71, respectively. Light rays from the left side of the scene pass through the transparent members 71 and are reflected by a mirror 72 secured at 73 to one wall of the offset portions 11. These rays are again reflected by a mirror 74 attached to one portion of a revolving shutter 75. The rays from the mirror 74 are reflected through the main photographic lens combination 76, carried by a holder 77 and thence through the medium focus lens 67 and filter 68 onto the film through the opening 51 in the shutter 50. The shutter 75 shown in Figure 1 cuts off the light rays from the right hand side of the scene.

The shutter is provided with an opening 78 which is adapted at every half turn of the shutter to be located opposite the transparent member 70 so that the light rays from the right hand side of the scene may pass through the lens combination 76, the medium focus lens 63, screen 65 and the opening 51 in the shutter 50 where it will affect the frame of the film 30. At this time it will be appreciated that the shaft 83 having revolved through 180° will cause the opening 78 to be placed in alignment with the transparent member 70 while the lens 63 and filter 65 will be positioned directly above the opening 51 in the shutter 50.

The holder 77 is carried by a bracket 80 secured to the wall 24 of the housing 10. This holder at its outer end carries the bearing 23 for the shaft 16.

A gear 81 is secured to the shaft 16 and meshes with a gear 82 secured to the shaft 83 which is mounted in suitable bearings on the bracket 80 and a side wall of the offset portion 11 of the housing. The gears 81, 82 and shaft 83 provide means for rotating the shutter 75 which is rigidly attached to the shaft 83.

A plate 85 is secured to the shutter 75 adjacent the opening 78 and is adapted when the shutter is revolved through 180° to be placed in alignment with the transparent member 71 to cut off light rays from the right hand side of the scene.

The holder 66 is provided with a cam member 86 which is adapted to engage a finger 87 on a marking member pivoted at 88 on the shutter 50. As the cam member 86 engages the finger 87 it will rock the marker 89 which is provided with some form of medium to apply a red mark to the film when the orange-red light rays of the scene affect a frame on the film 30. By this mechanism an inspection of the film will determine which frames of the film have registered the red light rays on the alternate frames of the film.

A portion of the film 90 which is reproduced by the present process and apparatus is shown in Fig. 2. The irregular line 91 represents the optical sound impressions so that the sound effects are properly co-ordinated with the various frames of the film. During the photographing of the optical natural color relief pictures of the scene the sound camera also records the sound effects and the films are developed in the usual manner after which the negative optical color sensitive relief film is placed in proper relation with the negative sound reel and they are run through the stock printer in the usual manner for obtaining a positive optical natural color relief projection film.

The film is provided with the usual perforations 92 adapted to be engaged by the teeth of a sprocket for moving the film through the camera. The line 91 representing the sound impressions is located between one series of the perforations 92 and the adjacent edges of the frames of the film.

The space 94 on the frame represents the optically delineated moving and still objects in the near and medium foreground which is the primary colors blue-green and represent the left hand view of the objects. The space indicated by the numeral 93 is the background of the left hand view of the scene which is indistinct and likewise blue-green.

The space indicated by the numeral 96 represents the moving or still objects in the near and medium foreground which is the primary colors of orange-red and depicts a right hand view of the scene. The space indicated by the numeral 95 represents the background which is indistinct and the primary colors orange-red. It will thus be seen that alternate frames of the film delineate on the one hand right hand effects of the objects in the foreground in orange-red while the remaining frames depict the left hand views of the objects in the foreground in blue-green so that in each foot of the film there will be shown eight frames in blue-green and eight frames in orange-red in alternation and when the film thus constructed is projected the proper scenes of the movements of the objects will be properly portrayed and in their natural colors. The background will be indistinct in approximately a neutral gray.

The operation of my device is as follows: The raw stock film is threaded through the openings 32 and 38 in the usual manner so that the main drum 26 and the idle drums will be in proper contact with the film for moving the film across the opening 44 in the camera. The film is also received by the groove in the pivoted plate 46. The lens 42 will provide the operator with a means for inspecting the scene as it is reflected by the mirror 43.

When the film is in position the crank 13 is operated, driving the shaft 16 which in turn causes rotation of the shaft 19 through the medium of the gears 17 and 18. The drum 26 is, therefore, revolved and the frames of the film are successively moved across the opening 44.

The rotation of the shaft 16 causes rotation of the arms 60 and 61, thereby placing the medium focus lens 63 and its corresponding filter 65 in alinement with the opening 44 once during the revolution of the shaft 16. This is also true of the medium focus lens 67 and the filter 68. Since these filters and lenses are diametrically disposed one of these filters and its corresponding lens will be alined with the opening 44 at each half revolution of the shaft 16. The operating mechanism is so constructed that one of the lenses 63 and its corresponding filter will be alined with a frame of the film as it is placed before the opening 44 and when the shutter 50 has been so positioned the opening 51 will likewise be in alinement with the opening 44. By this construction alternate photographic impressions on the film 90 or alternate frames will delineate alternately the primary color combination of blue-green and orange-red respectively.

A shaft 83 is revolved in synchronism with the shaft 16, the filters 65 and 68 and with the reciprocation of the shutter 50 so that when the shutter 75 is in the position shown in Figure 1, the rays from the right hand portion of the scene will strike the mirror 72 and be reflected by the mirror 74 on the shutter 75 through the photographic lens combination 76, the medium focus lens 67, the filter 68 and the opening 51 on to the frame of the film. This light impingement upon the frame of the film is instantly, and this light is cut off promptly by the reciprocating shutter 50. In the meantime the shutter 75 is revolving so that the opening 78 in the shutter 75 will be alined with the transparent medium 70 while the mask 85 is located in alinement with the transparent member 71. In this position of the shutter 75, the light rays which are passing through the transparent member 71 are cut off from the lens combination 76 and the light rays through the transparent member 70 are transmitted directly to the lens combination 76, the medium focus lens 63 and the filter 65. In this position of the shutter 75, the opening 51 in the shutter 50 has again alined with the opening 44 so that the rays of light from the opposite portion of the scene will be impinged upon the next succeeding frame of the film.

It will be appreciated that the filter 68 permits only the blue-green rays to affect the film while the filter 65 permits only the orange-red rays to affect the film.

This alternate reproduction of the blue-green and the orange-red colors of the scene are continued throughout the film.

Since the filters 65 and 68 are removable it will be appreciated that the usual black and white films can be produced with this device.

It will be appreciated that the pictures are taken instantly upon the positioning of the lens 63 or 67 and their associated filters in alignment with a frame of the film. The opening 51 in the shutter 50 is likewise positioned in alignment with the frame at the time that the lenses and associated filters reach their proper alignment with the frames.

I claim:

1. A binocular motion picture camera comprising a housing having a photographic lens combination, means within the housing for presenting successive frames of a raw stock film to a single focal point in rear of and alined with the lens combination, an opening in the housing for admitting light rays directly from the left hand portion of a scene to the lens combination, a second opening for admitting light rays to the interior of the housing from the right hand portion of the scene, means for directing the second-mentioned light rays upon the lens combination while cutting off the first-mentioned rays, means for moving the last-mentioned means in synchronism with the moving frames of the film for causing each of the two series of light rays to be exposed to alternate frames, and focusing lenses adapted to be moved alternately into position between a frame and the lens combination and in synchronism with the moving frames.

2. A binocular motion picture camera comprising a housing having a photographic lens combination, means within the housing for presenting successive frames of a raw stock film to a single focal point in rear of and alined with the lens combination, an opening in the housing for admitting light rays directly from the left hand portion of a scene to the lens combination, a second opening for admitting light rays to the interior of the housing from the right hand portion of the scene, means for directing the second-mentioned light rays upon the lens combination while cutting off the first mentioned rays, means for moving the last-mentioned means in synchronism with the moving frames of the film for causing each of the two series of light rays to be exposed to alternate frames, a color filter for each series of light rays mounted for movement, means for moving the filters in synchronism with the frames so that one filter will be alined with a frame when the corresponding series of light rays is exposed to the frame, and a medium focus lens associated with each filter.

3. A binocular motion picture camera comprising a housing having a photographic lens combination, means within the housing for presenting successive frames of a raw stock film to a single focal point in rear of and alined with the lens combination, an opening in the housing for admitting light rays directly from the left hand portion of a scene to the lens combination, a second opening for admitting light rays to the interior of the housing from the right hand portion of the scene, means for directing the second-mentioned light rays upon the lens combination while cutting off the first-mentioned rays, means for moving the last-mentioned means in synchronism with the moving frames of the film for causing each of the two series of light rays to be exposed to alternate frames, a color filter for each series of light rays, a medium focus lens mounted forwardly of each filter and movable with the respective filter, means mounting the filters for movement, means operatively connected to the moving means for causing each filter to be alined in alternation with the lens combination and with an alternate frame of the film.

4. The method of producing binocular motion picture films which comprises directing a stream of light rays from the left hand portion of a scene simultaneously with a stream of light rays from the right hand portion of the scene into an enclosed space, cutting off one stream of light rays while permitting the other stream to pass through a lens combination, focusing the stream of light rays transmitted through the lens combination upon the frame of a raw stock film while at the same time filtering the streams of light rays alternately so that one color combination of primary colors is registered on one frame and another color combination of primary colors is registered on a second consecutive frame while moving the frames successively in alinement with the focused and filtered rays for alternate registration of the filtered light rays of different color combinations.

5. The method of making binocular motion picture films which comprises transmitting photographic light impressions from a left hand portion of a scene through a lens combination, focusing the light passing through the lens combination at a common point while filtering the light rays and exposing a frame of a raw stock film to the filtered and focused light impressions at said point, cutting off said light impressions while transmitting light impressions from the right hand portion of the scene through the same lens combination, then focusing the light rays passing through the lens combination and filtering said rays to provide a color complementary to the color obtained by the previous filter, then exposing another and consecutive frame to the last-mentioned filtered and focused light impressions.

6. A binocular motion picture camera wherein successive frames of a film strip are exposed in rapid succession, a rotatable member having diametrically disposed spaced filters carried thereby, said filters adapted to be alternately placed across the light rays with successive exposures of the frames, said rotatable member having a depending cam adjacent one filter, a finger pivotally mounted on a fixed support and carrying a film marking means, said finger projecting vertically into the path of the cam, means for rotating the member so that the cam will engage the finger and move said finger inwardly towards the filter and cause the marking means to connect with alternate frames of the film.

FRANK B. CROSIER.